US010591574B2

(12) United States Patent
Furuhashi et al.

(10) Patent No.: US 10,591,574 B2
(45) Date of Patent: Mar. 17, 2020

(54) RADIOWAVE MONITORING DEVICE

(71) Applicant: MITSUBISHI ELECTRIC CORPORATION, Chiyoda-ku (JP)

(72) Inventors: Hideyuki Furuhashi, Chiyoda-ku (JP); Hiroaki Tsukagoshi, Chiyoda-ku (JP)

(73) Assignee: MITSUBISHI ELECTRIC CORPORATION, Chiyoda-ku (JP)

( * ) Notice: Subject to any disclaimer, the term of this patent is extended or adjusted under 35 U.S.C. 154(b) by 670 days.

(21) Appl. No.: 15/308,873

(22) PCT Filed: May 29, 2015

(86) PCT No.: PCT/JP2015/065564
§ 371 (c)(1),
(2) Date: Nov. 4, 2016

(87) PCT Pub. No.: WO2015/186628
PCT Pub. Date: Dec. 10, 2015

(65) Prior Publication Data
US 2017/0074963 A1 Mar. 16, 2017

(30) Foreign Application Priority Data
Jun. 2, 2014 (JP) .................................. 2014-113838

(51) Int. Cl.
*G01S 3/06* (2006.01)
*H04B 7/08* (2006.01)
*G01S 3/48* (2006.01)

(52) U.S. Cl.
CPC .................. *G01S 3/06* (2013.01); *G01S 3/48* (2013.01); *H04B 7/084* (2013.01)

(58) Field of Classification Search
CPC .............. G01S 3/06; G01S 3/48; H04B 7/084
See application file for complete search history.

(56) References Cited

U.S. PATENT DOCUMENTS 5,218,359 A * 6/1993 Minamisono ............. G01S 3/30
342/378
5,966,095 A * 10/1999 Hiramatsu ........... H04B 7/0842
342/378
(Continued)

FOREIGN PATENT DOCUMENTS

JP 2003-008483 A 1/2003
JP 2013-234871 A 11/2013
JP 2014-098615 A 5/2014

OTHER PUBLICATIONS

International Search Report dated Aug. 25, 2015 in PCT/JP2015/065564 filed May 29, 2015.
(Continued)

*Primary Examiner* — Cassi J Galt
(74) *Attorney, Agent, or Firm* — Oblon, McClelland, Maier & Neustadt, L.L.P.

(57) ABSTRACT

An array antenna includes a plurality of antennas capturing a coming radio wave and outputting a received signal respectively. An A-D converter converts the received signal to a digital signal, and a frequency detector detects a frequency of the received signal. A sparse signal processor calculates complex amplitudes, which are coefficients for base vectors, each of the base vectors expressing phases of the antennas of the array antenna receiving a radio wave coming from each direction in determined directions, used in expressing the received signal as a linear sum of a finite number of the base vectors, separates the received signal into direction signals for each direction, and calculates the phase of the each of the direction signals. A signal synthesizer aligns the phases of the direction signals using phase differences calculated from phases of the complex amplitudes, and synthesizes the direction signals.

2 Claims, 4 Drawing Sheets

(56) References Cited

U.S. PATENT DOCUMENTS

2004/0174300 A1  9/2004  Nakagawa
2012/0259590 A1  10/2012  Ye et al.

OTHER PUBLICATIONS

Sanada, Yukitoshi, "Evolution and Recent Researches on RAKE Reception," IEICE Fundamentals Review, vol. 5, No. 1, Jul. 2011, pp. 20-27.

Cetin, Mujdat et al., "A Variational Technique for Source Localization Based on a Sparse Signal Reconstruction Perspective," IEEE International Conference on ICASSP 2002, May 2002, vol. 3, pp. 2965-2968.

* cited by examiner

RADIOWAVE MONITORING DEVICE

TECHNICAL FIELD

The present disclosure is related to a radio wave monitoring device.

BACKGROUND ART

In a device to monitor a radio wave radiated in the air, due to reception of the radio wave as multipath waves in which a direct wave and reflected waves (delayed waves) coming through various reflection paths are included, there are cases in which demodulation becomes difficult, a signal level of a received signal is dropped, or a signal cannot be analyzed.

A scheme referred to RAKE reception described in Non-Patent Literature 1 can be cited for solving the influence of the multipath waves. Regarding the multipath waves of a signal having a broad frequency band such as a spectrum diffusion signal, the RAKE reception can improve performance of demodulating the received signal by means of pass diversity. However, the effectiveness of the RAKE reception is limited to a signal having a broad frequency band such as the spectrum diffusion signal.

For example, as in Patent Literature 1, the sparse vector estimation method is proposed for use in angle measurement processing such as in a radar. The observation equipment of Patent Literature 1 estimates a relative distance to an object-to-be-observed using a distance measurer. An angle measurer adjusts an internal parameter in the estimation process in response to the relative distance to the object-to-be-observed estimated in the distance measurer, and estimates a direction to which the object-to-be-observed exists.

CITATION LIST

Patent Literature

Patent Literature 1: Unexamined Japanese Patent Application Kokai Publication No. 2013-234871

Non Patent Literature

Non Patent Literature 1: "Evolution and Recent Researches on RAKE Reception", written by Yukitoshi SANADA, TEICE Fundamentals Review Vol. 5 No. 1, p. 20-27

SUMMARY OF INVENTION

Technical Problem

As previously described, there exists a scheme that can process effectively multipath waves for the signal having a broad frequency band such as the spectrum diffusion signal. However, the radio wave monitoring device is required to receive and monitor various signals, not only the spectrum diffusion signal. Therefore countermeasures for the multipath waves are required that do not depend on the type of transmission waves or receiving conditions. Although the RAKE reception presently exists as a reception scheme processing the multipath waves, the RAKE reception is not suitable for a radio wave monitoring device receiving various types of communication waves.

The present disclosure is made in consideration of the above-mentioned circumstances. The objective of the present disclosure is to improve a strength of the received signal, even when the multipath waves in which a direct wave and various reflected waves are included is received by the radio wave monitoring device.

Solution to Problem

To achieve the above-mentioned object, the radio wave monitoring device according to an aspect of the present disclosure includes an array antenna, an analog discrete converter, a frequency detector, a sparse signal processor and a signal synthesizer. The array antenna includes a plurality of antennas, and each of the plurality of antennas captures radio wave coming and arrived at the antenna and generates a received signal. The analog discrete converter converts the received signal of each of the antennas expressed in analog into a digital signal, and the frequency detector detects the frequency of the received signal. The sparse signal processor calculates a plurality of complex amplitudes, which are coefficients for the base vectors, each of the base vectors expressing phases of the antennas of the array antenna receiving a radio wave coming from each direction in determined directions, used in expressing the received signal received with the array antenna as a linear sum of a finite number of the base vectors, separates the received signal into direction signals, each of which is a signal for each of the determined directions, and calculates the phase of each of the separated direction signals. The signal synthesizer aligns the phase of each of the direction signals separated in the sparse signal processor using phase differences calculated from phases of the complex amplitudes which are the coefficient calculated in the sparse signal processor, and synthesizes the direction signals.

Advantageous Effects of Invention

According to the present disclosure, the coming radio waves from each of the determined directions are separated by the sparse signal processing, and the phases of the separated signals are aligned and the separated signals are synthesized. Thus the strength of the received signal can be improved. As a result, the received signal can be demodulated, even if the received signal level is low.

DESCRIPTION OF EMBODIMENTS

Embodiment 1

Figure 1:
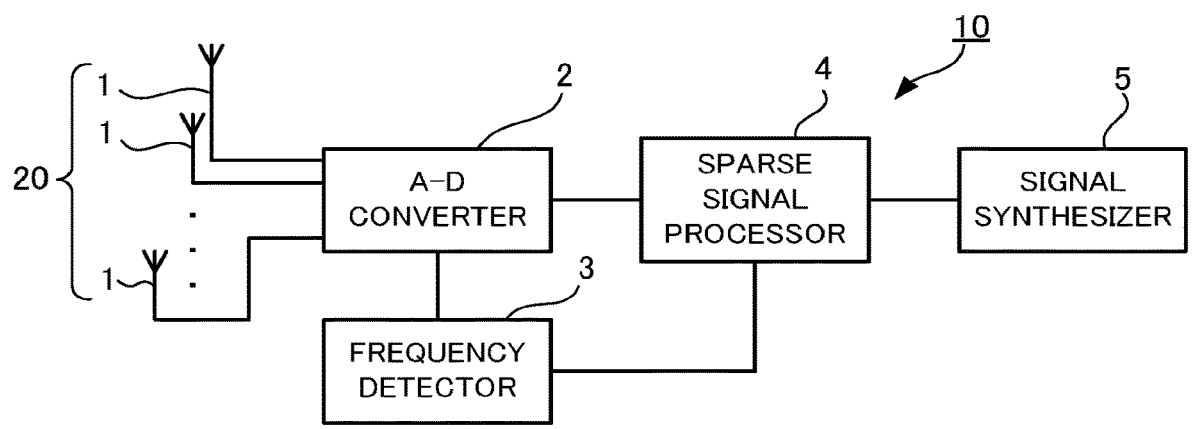
FIG. 1 is a block diagram illustrating an exemplary configuration of a radio wave monitoring device according to Embodiment 1 of the present disclosure.

FIG. 1 is a block diagram illustrating an exemplary configuration of a radio wave monitoring device according to Embodiment 1 of the present disclosure. A radio wave monitoring device 10 includes an array antenna 20 that is formed of a plurality of antennas 1 arranged in a one-dimensional or two-dimensional array, an A-D converter 2, a frequency detector 3, a sparse signal processor 4 and a signal synthesizer 5. The radio wave monitoring device 10 receives coming radio wave with the array antenna 20, signal-processes the received signals generated from the received radio wave to separate the received signal into signal components for the radio wave coming directions. And then the radio wave monitoring device 10 aligns the phases of the separated signal components, synthesizes the separated signal components and outputs the synthesized signal from the signal synthesizer 5. The synthesized signal output from the signal synthesizer 5 can be demodulated and decoded, and data can be analyzed. An amplifier for the received signal is omitted from FIG. 1.

Each of the antennas 1 of the array antenna 20 captures a coming radio wave and outputs a received signal. The A-D converter 2 samples the received signal for each of the antennas 1 at a frequency sufficiently higher than the frequency of the observing radio wave and A-D (Analog to Digital) converts the sampled received signal. The A-D converter 2 is an analog discrete converter converting the analog received signal into a digital signal. The frequency detector 3, for example, fast Fourier transforms an A-D converted signal to detect a frequency (a carrier frequency) of the received signal.

When the number of the antennas 1 of the array antenna 20 is expressed as M, and the frequency of the received signal is expressed as f, the received signal Y(t) can be described as a function of time t as follows. Here, a vector is expressed as a capital letter of the alphabet like vector X, and an ith component of the vector X is expressed as x[i]. Here, z[i], i=1, 2, . . . , m are complex amplitudes, Z is an M-dimensional vector of the complex amplitudes, and j means an imaginary unit.

$$Y(t) = (y[1](t), y[2](t), \ldots, y[m](t)) \quad (1)$$
$$= (z[1], z[2], \ldots, z[m]) \cdot \exp(j2\pi ft)$$
$$= Z \cdot \exp(j2\pi ft)$$

Here, although the received signal is sampled, characteristics of the sampled signal are assumed not to be changed by the sampling from the characteristics of the original signal, and the received signal is expressed as a temporally continuous signal.

The sparse signal processor 4 generates a base vector expressing the phases of the received signal of the antennas 1 of the array antenna 20 in a case in that the radio wave of the frequency detected by the frequency detector 3 comes from each of the determined directions. For example, the sparse signal processor 4 calculates, from the frequency and the spacing between the antennas 1 in the array antenna 20, phase differences of the antennas 1 when the radio wave come from each of the determined directions and makes signals of the antennas 1 having phase differences, to be a base vector of the direction.

For example, all of the antennas 1 are assumed to be disposed on one straight line in the array antenna 20, and the spacing of the antennas is expressed as L. An angle made by an azimuth of a coming direction of a radio wave and the straight line along which the antennas are disposed is assumed to be θAZ, and an angle made by a direction perpendicular to the array antenna 20 and the radio wave coming direction is assumed to be θEL, a base vector A(θAZ, θEL) can be expressed as follows. In addition, the velocity of light is expressed as c.

$$A(\theta AZ, \theta EL) = (1, \exp(j\varphi), \exp(j2\varphi), \ldots, \exp(j(m-1)\varphi)) \quad (2)$$

Here, $$\varphi = 2\pi \cdot (fL/c) \cdot \sin(\theta EL) \cdot \cos(\theta AZ) \quad (3)$$

Azimuth angles and elevation angles are determined for each step size corresponding to a determined resolution, and a case in that N sets of azimuth angles and elevation angles are created is supposed. The azimuth angle and the elevation angle in the ith set are expressed as θAZ[i] and θEL[i]. Base vectors in each direction A[i]=A(θAZ[i], θEL[i]) are put together to form a base matrix [A], the base matrix can be expressed as follows. As the base vector A[i] is M dimensional, the base matrix [A] is a matrix having M rows and N columns.

$$[A] = (A(\theta AZ[1], \theta EL[1], A(\theta AZ[2], \theta EL[2]), \ldots, \quad (4)$$
$$A(\theta AZ[N], \theta EL[N]))$$
$$= (A[1], A[2], \ldots, A[N])$$

θAZ is determined, for example, to be 0 degrees, ±10 degrees, ±20 degrees, ±30 degrees, . . . , 90 degrees for every 10 degrees, and θEL is determined, for example, to be 0 degrees, ±10 degrees, ±20 degrees, ±30 degrees, and ±40 degrees for every 10 degrees. For a set of θAZ and θEL, a base vector is defined as expressed in the expressions (2) and (3).

The smaller the difference of the direction angles are, the better the resolution of the multipath are. Decreasing the difference of the direction angles increases the number of the base vector, and the increased number of the base vector increases the amount of calculation. If the frequency of the radio wave to be monitored by the radio wave monitoring device is determined, a base vector may be preliminarily generated and retained.

The sparse signal processor 4 using such base vectors, calculates the coefficients (the coefficient vector) for the base vectors when the signals received at the array antenna 20 are expressed as a linear sum of a finite number of the base vectors obtained one by one in order from a maximum component. The coefficient vector expresses strength for each of the radio wave coming directions. For example, each component of the coefficient vector is calculated one by one in order from the component having the largest absolute value, and components whose absolute value is smaller than the threshold are not calculated.

The received signal y[k](t) is defined as a sum of the base vector A(θAZ[k], θEL[k]) for every direction multiplied by the coefficient s[k](t). A vector putting together elements s[k](t) is represented as a coefficient vector S(t), the coefficient vector S(t) can be expressed as follows. Here, u[i], i=1, 2, . . . , N are complex amplitudes, and U is a N-dimensional vector of the complex amplitudes.

$$S(t) = (s[1](t), s[2](t), \ldots, s[N](t)) \quad (5)$$
$$= (u[1], u[2], \ldots, u[N]) \cdot \exp(j2\pi ft)$$
$$= U \cdot \exp(j2\pi ft)$$

The following relationship exists between the received signal vector Y(t) and the coefficient vector S(t) of the array antenna 20. Here, N(t) is a vector expressing noise received at each of the antennas 1. The vector N means a vector N of complex amplitude to express the noise.

$$Y(t)=[A]\cdot S(t)+N(t) \quad (6)$$

$$Z=[A]\cdot U+N \quad (7)$$

In this way, we can obtain a relational expression in a case of a single frequency signal. In a case of a modulated wave, there exists a plurality of signals having different frequencies. However, the following relational expressions are satisfied for each frequency f to be considered for the modulated wave.

$$Y(t,f)=[A(f)]\cdot S(t,f)+N(t) \quad (8)$$

$$Z(f)=[A(f)]\cdot U(f)+N \quad (9)$$

An algorithm of the sparse signal decomposition is used to calculate the coefficient vector. For example, Matching Pursuit (MP) can be used in which base vectors are selected one by one repetitively to decompose the signal. Other than MP, Orthogonal Matching Pursuit (OMP), Basis Pursuit Denoising (BPDN), Block Coordinate Relaxation (BCR), and the like may be used as the algorithm of the sparse signal decomposition.

The non-zero components of the coefficient vector acquired in this way correspond to coming directions of the radio wave. Signals can be separated into each of the coming directions in the sparse signal processor 4. The strengths of the direction signals, which are separated signals for every direction, are expressed in absolute values of the complex amplitudes. In addition, the phase difference of each set of separated direction signals is a phase difference of the complex amplitudes.

The signal synthesizer 5 aligns the phase of the direction signals separated in the sparse signal processor 4 using the phase differences acquired in the sparse signal processor 4 and synthesize the direction signals. In other words, the separated signals are shifted by each of the phase differences, multiplied by each of the coefficients and added. Because signals are synthesized in a condition in that the phases of the signals from all coming directions are aligned, the signals are strengthened. Thus, the strength of the received signal is improved.

Figure 2:
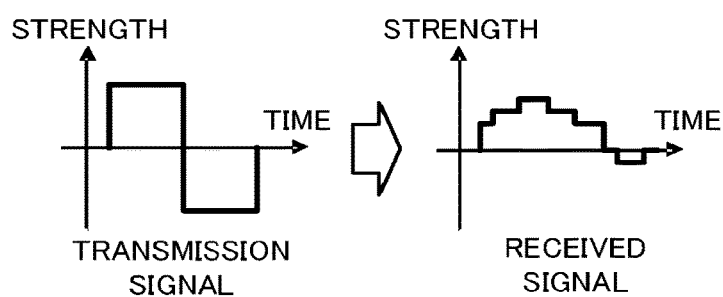
FIG. 2 is a conceptual diagram illustrating a relationship between a transmission signal and a received signal including multipath waves.

FIG. 2 is a conceptual diagram illustrating a relationship between a transmission signal and a received signal including multipath waves. The received signal including the multipath waves is a signal in which a direct wave and reflected waves (delayed waves) arriving via various reflection paths are included. Therefore signals passing through different paths mutually strengthen and weaken, and the received signal has a disturbed waveform in comparison to the transmission signal.

Figure 3:
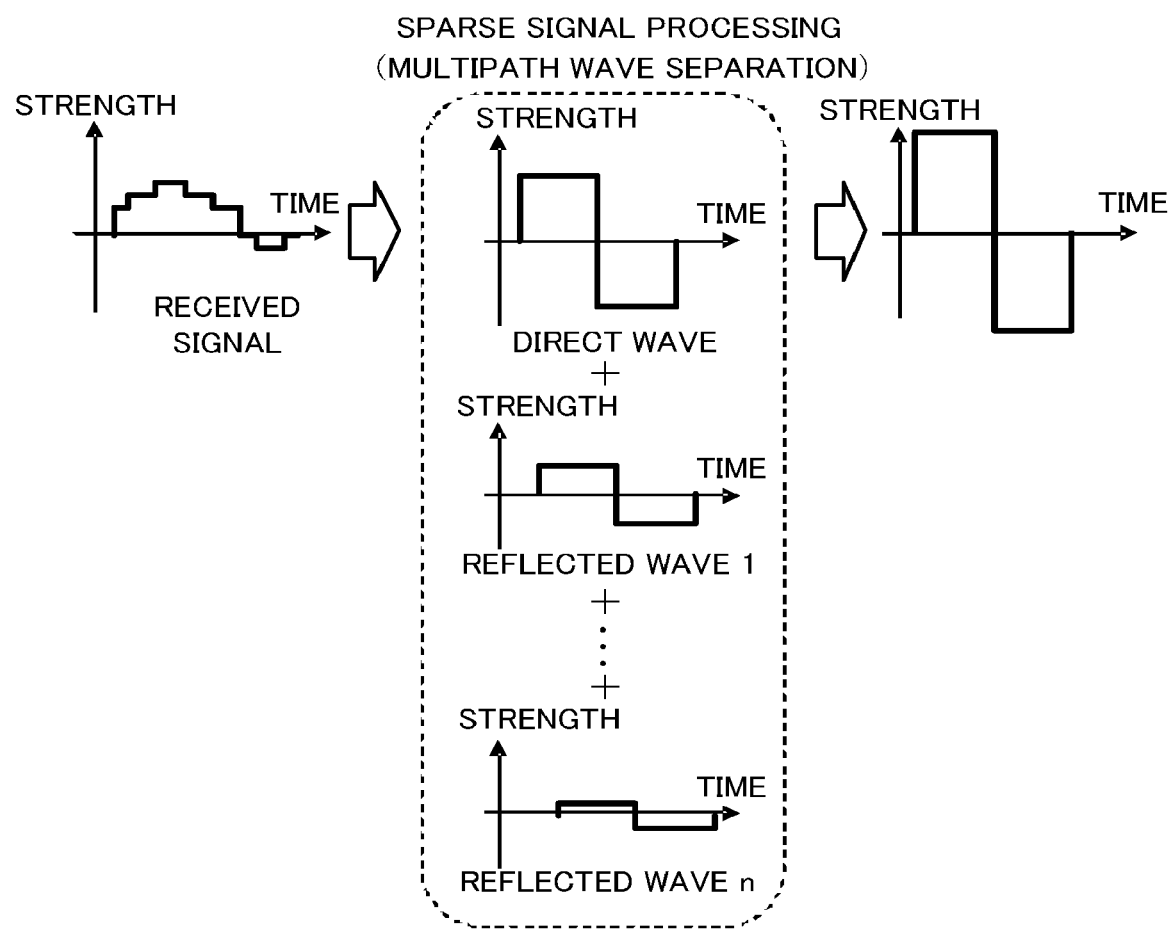
FIG. 3 is a conceptual diagram illustrating a received signal before and after signal processing according to Embodiment 1.

FIG. 3 is a conceptual diagram illustrating a received signal before and after signal processing according to Embodiment 1. The radio wave monitoring device 10 according to Embodiment 1 separates the received signal including the multipath waves as illustrated in FIG. 2 for each coming direction in the sparse signal processing, in other words, the received signal is separated into a direct wave and reflected waves. At this stage, there are phase differences between the direct wave and each of the reflected waves. When the phases of the direct wave and the reflected waves are aligned and the direct wave and the reflected waves are synthesized, as illustrated in the right waveform in FIG. 3, a waveform is acquired which has improved strength and is close to the waveform of a transmission signal.

Figure 4:
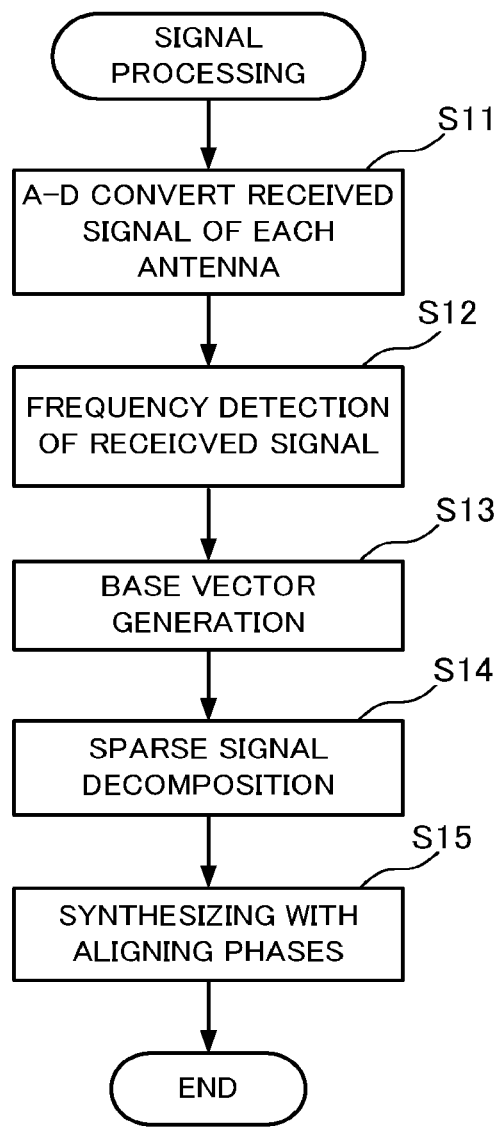
FIG. 4 is a flow chart illustrating an example of an operation of the signal processing according to Embodiment 1.

FIG. 4 is a flow chart illustrating an example of an operation of the signal processing according to Embodiment 1. As previously described, the A-D converter 2 performs an A-D conversion on the received signal for each of the antennas 1 (step S11). The frequency detector 3 detects the frequency of the received signal (step S12). The sparse signal processor 4 generates the base vectors each of which is an antenna pattern, for each of the determined directions, of the array antenna 20 at the frequency detected by the frequency detector 3 (step S13). Then, the received signal is decomposed in the sparse signal processing, the coefficients of the base vectors are calculated, the received signal is separated into each of the directions, and the phase of the separated signal for each of the directions is calculated (step S14).

The signal synthesizer 5 aligns the phase of the signal for each of the directions separated by the sparse signal processor 4 using the phase differences acquired by the sparse signal processor 4, and synthesizes the signal for each of the directions (step S15).

As mentioned above, the radio wave monitoring device 10 of Embodiment 1 separates the coming radio waves from each of the determined directions with the sparse signal processing and synthesizes the separated signals with aligning the phases of the separated signals. Therefore, the strength of the received signal can be improved. As a result, the received signal can be demodulated even if the level of the received signal is low.

Embodiment 2

Figure 5:
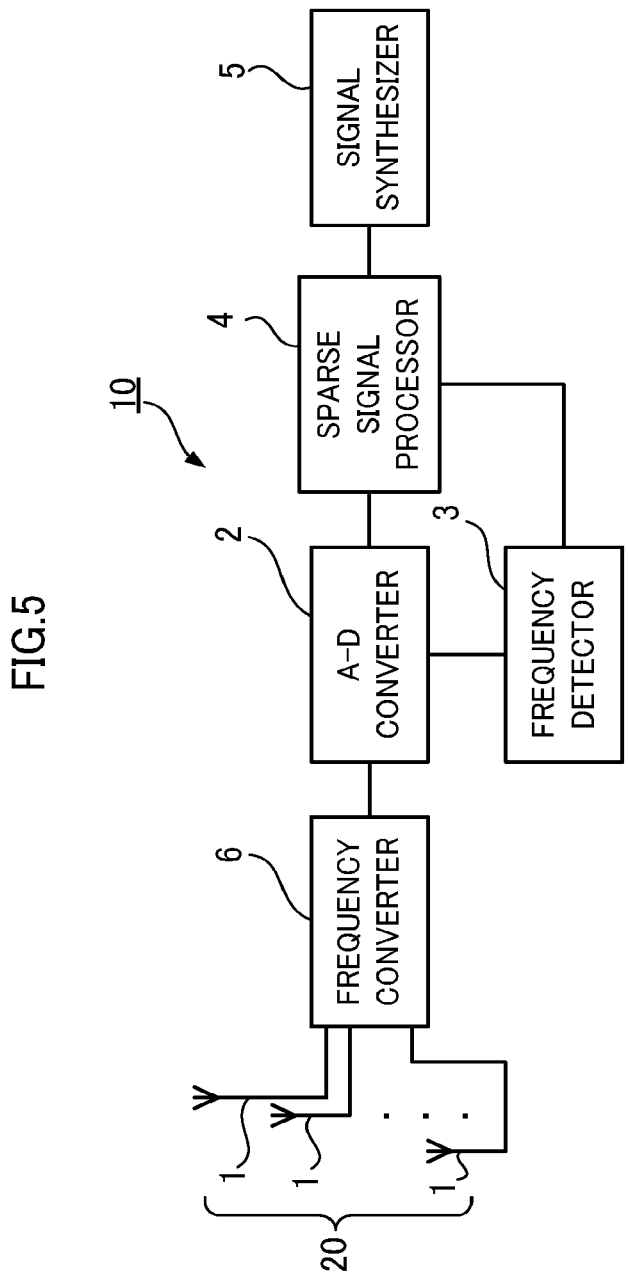
FIG. 5 is a block diagram illustrating an exemplary configuration of a radio wave monitoring device according to Embodiment 2 of the present disclosure.

FIG. 5 is a block diagram illustrating an exemplary configuration of a radio wave monitoring device according to Embodiment 2 of the present disclosure. In Embodiment 2, the received signal is converted (down-converted) to an intermediate frequency suitable for signal processing. The A-D converter 2 and its downstream components process the received signal converted into the intermediate frequency. The radio wave monitoring device 10 according to Embodiment 2 includes a frequency converter 6 disposed between the array antenna 20 and the A-D converter 2. The remaining configuration is the same as the radio wave monitoring device 10 according to Embodiment 1. The amplifier is omitted also from FIG. 5.

The radio wave monitoring device 10 according to Embodiment 2 converts a frequency of the received signal output from the array antenna 20 to an intermediate frequency with the frequency converter 6. The frequency converter 6 mixes the received signal with a signal of a frequency generated by a local oscillator (not shown) and obtains a signal of the intermediate frequency. The frequency of the signal generated by the local oscillator to convert into the intermediate frequency may be changed in accordance with the monitoring target frequency.

Processing in and after the A-D conversion, Embodiment 2 is not different from Embodiment 1 except for the handling of the received signal. In other words, the A-D converter 2 A-D converts the frequency-converted received signal for each of the antennas 1. The frequency detector 3 detects the frequency of the frequency-converted signal, and the sparse signal processor 4 decomposes the received signal of the intermediate frequency with the sparse signal processing, separates the received signal into each of the directions, and calculates the phases. The signal synthesizer 5 aligns the phases of the separated intermediate frequency signal and synthesizes the separated intermediate frequency signals.

Because the radio wave monitoring device 10 according to Embodiment 2 converts the received signal into the intermediate frequency and performs signal processing, the sampling frequency can be lowered. As a result, processing in and after the A-D conversion becomes easy. In addition, although no filter is illustrated in FIG. 1 and FIG. 5, a filter can improve frequency selectivity for monitoring radio waves.

The present disclosure can be embodied in various ways and can undergo various modifications without departing from the broad spirit and scope of the disclosure. Moreover, the embodiment described above is for explaining the present disclosure, and does not limit the scope of the present disclosure. In other words, the scope of the present disclosure is as set forth in the Claims and not the embodiment. Various changes and modifications that are within the scope disclosed in the claims or that are within a scope that is equivalent to the claims of the disclosure are also included within the scope of the present disclosure.

This application claims the benefit of Japanese Patent Application No. 2014-113838, filed on Jun. 2, 2014, the entire disclosure of which is incorporated by reference herein.

REFERENCE SIGNS LIST

1 Antenna
2 A-D converter
3 Frequency detector
4 Sparse signal processor
5 Signal synthesizer
6 Frequency converter
10 Radio wave monitoring device
20 Array antenna.

The invention claimed is:

1. A radio wave monitoring device, comprising:
    an array antenna including a plurality of antennas, each of the plurality of antennas receiving a radio wave and generating a received signal, the array antenna generating a plurality of received signals;
    an analog discrete converter configured to convert the plurality of received signals expressed in analog into a plurality of digital received signals expressed in digital;
    a frequency detector configured to detect a frequency of the plurality of digital received signals;
    a sparse signal processor configured to calculate a plurality of complex amplitudes which are coefficients for a plurality of base vectors, each of the plurality of base vectors expressing phases, at the frequency detected by the frequency detector, of the plurality of antennas included in the array antenna receiving a radio wave coming from each of a plurality of predetermined directions, the plurality of base vectors and the coefficients being used in expressing the plurality of digital received signals as a linear sum of a finite number of the base vectors multiplied by respective coefficients, to separate the plurality of digital received signals into a plurality of direction signals, each of the plurality of direction signals being a signal coming from the direction corresponding to a non-zero component in the coefficients, and to calculate the phase of each of the separated direction signals from the phase of the corresponding complex amplitude being the non-zero component in the coefficients; and
    a signal synthesizer configured to align the phase of the direction signals separated by the sparse signal processor using phase differences calculated from phases of the complex amplitudes calculated by the sparse signal processor, and to synthesize the direction signals.

2. The radio wave monitoring device according to claim 1, comprising a frequency converter configured to convert the received signal generated by each of the antennas to a received signal having an intermediate frequency;
    wherein the analog discrete converter, the frequency detector, the sparse signal processor and the signal synthesizer process the plurality of received signals having the intermediate frequency.

* * * * *